Figure 1:
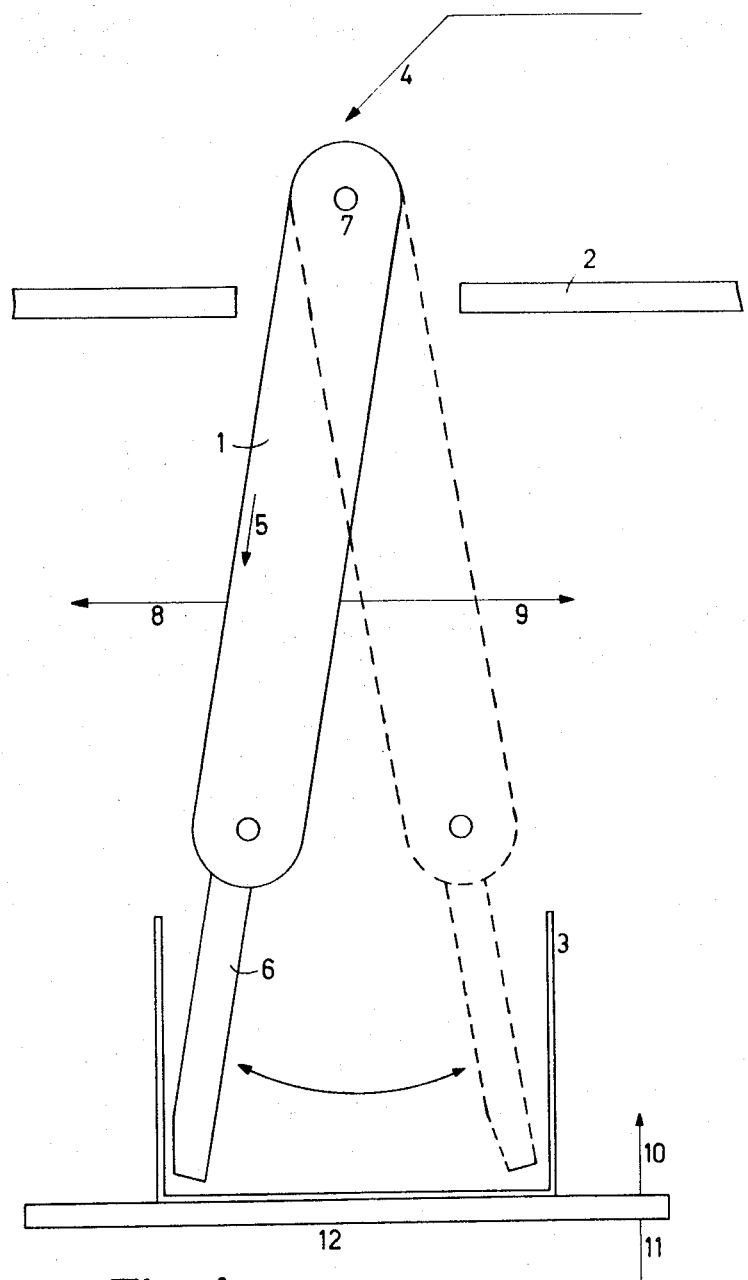

United States Patent [19]
Keizer

[11] 3,760,560
[45] Sept. 25, 1973

[54] PACKING MACHINE
[75] Inventor: Wichert Eimert Keizer, Hengelo, Netherlands
[73] Assignee: N.V. Hollandse Signaalapparaten, Hengelo, Netherlands
[22] Filed: Nov. 10, 1971
[21] Appl. No.: 197,287

[30] Foreign Application Priority Data
Nov. 17, 1970 Netherlands...................... 7016799

[52] U.S. Cl......................... 53/162, 53/245, 198/73
[51] Int. Cl.............................................. B65b 5/10
[58] Field of Search...................... 53/148, 150, 162, 53/236, 245, 248, 259, 260; 193/7, 32; 198/26, 35, 43, 73; 214/6 H

[56] References Cited
UNITED STATES PATENTS
1,423,854  7/1922  Howard............................ 198/73 X
540,723  6/1895  Colgin................................ 214/6 H Primary Examiner—Robert L. Spruill
Attorney—Frank R. Trifari

[57] ABSTRACT

A packing machine is provided with a transport system by means of which articles to be packed are transferred from a higher location to an available receptacle. A chute is connected to the transport system at its lower end and is suspended to a shaft located above the receptacle at its upper end. The transport system is further provided with attachment devices by means of which the transport system with chute can perform a swinging movement about the shaft. The possible motion of the transport system with chute in the horizontal direction, corresponds to the size of the layer of articles to be placed into the receptacle and is in such a way that the articles conveyed by the transport system and dropped through the chute are uniformly placed into the receptacle.

4 Claims, 2 Drawing Figures

PACKING MACHINE

The invention relates to a packing machine provided with a transport system by which articles to be packed are transferred from a higher location to an available receptacle. The articles conveyed in this way may be dumped into the receptacle direct or be placed into the receptacle in an orderly manner by human intervention. If the articles to be packed are small in size and several rows of such articles have to be placed next to one another in a relatively deep receptacle, this human intervention infers — in view of the clumsy body position to be taken during packaging — extremely hard work, for which hardly any manpower may be obtained.

Hence, the object of the invention is to provide a packing machine which completely overcomes these difficulties.

According to the invention the transport system is connected at the lower end to a chute which is practically in line with said transport system. The system is suspended at the upper end to a shaft located above the receptacle and is freely rotatable about said shaft. The transport system is also provided with attachment devices located near the center or the lower end by means of which the transport system with chute can perform a swinging movement about the above-mentioned shaft. The possible motion of the transport system with chute in horizontal direction, so obtained, corresponds to the size of the layer of articles to be placed into the receptacle and which motion is in such a way that the articles conveyed by the transport system and dropped through the chute are placed uniformly into the receptacle.

Although the respective articles can be placed in a row into the receptacle in the above-described manner, it is advisable that several rows be placed into the receptacle simultaneously. According to the invention the chute is built up for this purpose from a channel system of which the number of channels corresponds to the number of conveyor belts taken up in the transport system.

If the shape of the articles to be packed is oblong and their centre of gravity is not in the centre they may overturn during their drop through the channel system and not land in the receptacle in the correct way. This may cause the channels to be blocked so that the packing process will be held up. The invention is directed at eliminating this difficulty. According to the invention each of these channels is fitted with a number of flaps provided with counterweights and in such a way that the mutual distance between two successive flaps in the same channel is about half the length of the articles to be packed, whereby the flaps are swung down by the weight of the supplied articles to be packed. Each time an article to be packed passes the respective flap during its drop the flaps return to their original position.

Figure 2:
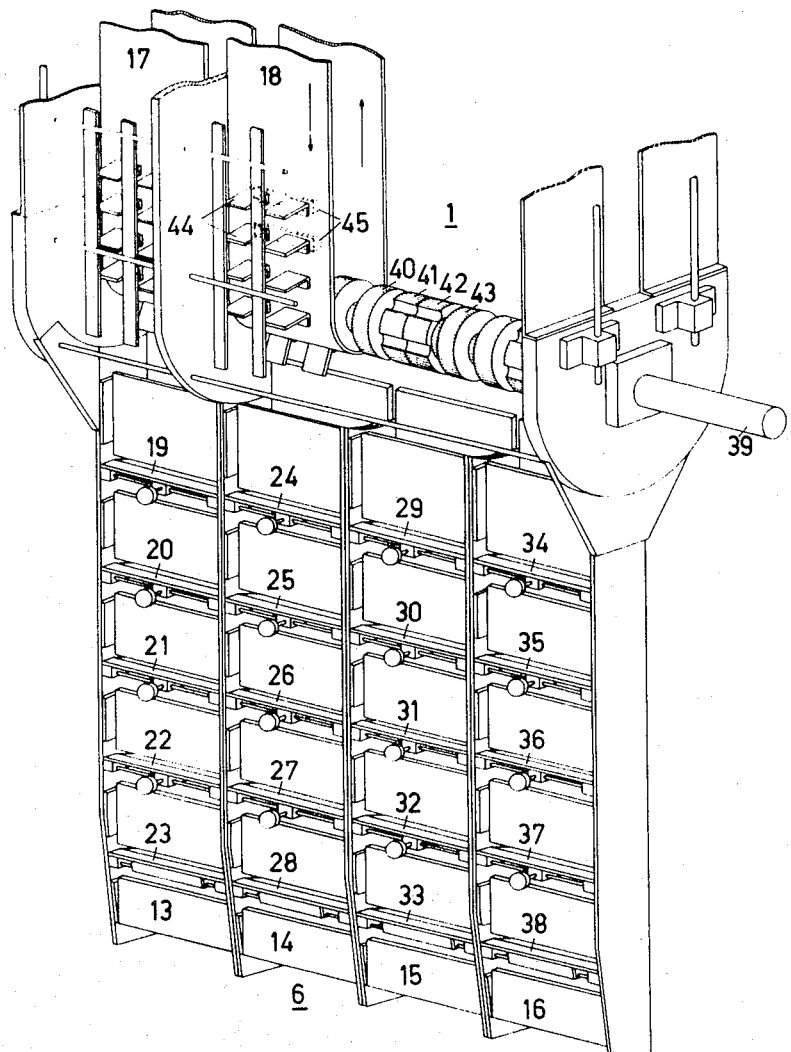

The invention will be further explained by means of the figres, of which:

FIG. 1 illustrates the principle of the packing machine according to the invention, while FIG. 2 shows in detail the lower end of the transport system with the channel system.

Like parts in both figures are denoted by like reference numerals.

In FIG. 1 the numeral 1 denotes a transport system by means of which articles to be packed can be conveyed from a higher location 2 — for instance through a hole provided in the floor of a higher story — to an available receptacle 3. To this effect the articles to be packed can be placed on the transport system 1 at the higher location 2 in the direction indicated by the arrow 4 by means of a conveyor belt (not illustrated in the figure) in order to be conveyed to the receptacle in the direction indicated by the arrow 5.

According to the invention the transport system 1 is connected at the lower end to a chute 6 which is practically in line with said transport system, the transport system is suspended at the upper end to a shaft 7 located above the receptacle 3, said transport system being freely rotatable about said shaft, and the transport system is also provided with attachment devices located near the centre or lower end (not illustrated in the figure) by means of which the transport system with chute can perform a swinging movement about the shaft 7, whereby the possible motion of the transport system with chute, so obtained, in the direction indicated by the arrows 8 and 9 corresponds to the size of the layer of articles to be placed into the receptacle 3 and which motion is in such a way that the articles conveyed by the transport system and dropped through the chute 6 are uniformly placed into the receptacle.

The receptacle 3 is positioned on a platform 12 which is movable in the directions indicated by the arrows 10 and 11. The vertical position of the platform should be such that during a swinging movement by the transport system with chute the distance between the lower end of the chute and the layer on which the articles to be packed are to be placed does not become greater than that corresponding to a little less than twice the height of the articles to be packed. To this effect the transport system with chute should have a minimum length which is dependent upon the height of the articles to be packed. In this way it is achieved that two or more articles to be packed are placed on top of each other in the receptacle at any moment during the swinging movement performed by the transport system with chute. Each time after a layer of articles is placed in the package in the above-described manner, the platform 12 should be lowered a distance corresponding to the height of the articles to be packed. The lower end of the transport system 1 with the chute 6 is illustrated in detail in FIG. 2. The chute 6 is built up of four channels: 13, 14, 15 and 16; this number of channels corresponds to the number of conveyor belts of which the transport system is built up. Only two conveyor belts 17 and 18, are shown in the figure. Each of the channels is provided with a number of flaps, respectively 19-23, 24-28, 29-33 and 34-38, which are fitted in such a way that the mutual distance between two successive flaps in the same channel is about half the length of the articles to be packed. Each of the flaps is provided with a counterweight. In this way it is achieved that, if an article to be packed is thrown, for instance, from the conveyor belt 17 into the respective channel 13, the shape of this article is oblong and its center of gravity is not in the center, while this article was conveyed by the conveyor belt in a position horizontal in the longitudinal direction, the article lands on the flap 19 before it would be tilted too far. The flap 19 will not swing down under the weight of this article until it is again in a practically horizontal position and thus can exert sufficient pressure on the flap. The article then drops on the flap 20. Again, here applies that the article lands on the flap 20 before it would be tilted too far. The article thrown in the channel 13 passes the flaps 19–23 in the manner described above, without any appreciable change in its spatial orientation during the dropping. Hence, the article is placed in horizontal position into the receptacle 3; consequently the channel cannot get blocked. As soon as an article to be packed has passed one of the flaps, this flap, under the influence of the counterweight fitted to this flap, returns to its original position. Another way for swinging down the flaps under the described pressure and returning them to their original position is by using spring mechanisms instead of counterweights. However, the use of springs has the disadvantage that after long use the tensile force can change in such a way that, depending on the way in which the springs are fitted, the flaps are either not swinging down at all anymore or are swinging down too fast, so that a tilting movement of the article to be packed is insufficiently compensated. The counterweights of the bottom flaps must be fitted in such a way that they do not protrude to such an extent that they arrest the movement of the chute near its extreme position. The counterweights fitted to the flaps 19–22, 24–27, 29–32 and 34–37 are screwed on pins secured to the flaps at the bottom, enabling an easy setting of the moment at which the flaps swing down. On the other hand the counterweights fitted to the flaps 23, 28, 33 and 38 consist of weighted strips secured to the edges of the flaps at the bottom.

In order to ensure that an article to be packed is thrown simultaneously into the corresponding channel by the respective conveyor belts, the transport system 1 is provided with a synchronization mechanism. A number of disc combinations are fitted round the shaft 39 forming a part of the transport system 1. This number corresponds to the number of applied conveyor belts. Each disc combination consists of four discs 40, 41, 42, and 43, of which the center discs 41 and 42 are provided with recesses. The conveyor belts are provided with carriers 44. At the places where these carriers are attached to the conveyor belts half-round strips 45 are provided at the back of the conveyor belts. These strips are of such dimensions that they exactly fit into the recesses provided in the discs 41 and 42 on the one hand, while they can move exactly between the discs 40 and 43 on the other hand. This ensures a synchronous movement of the conveyor belts, while any horizontal displacement of a conveyor belt with respect to a corresponding channel is eliminated.

I claim:

1. A packing machine comprising a transport system rotatably mounted for swinging movement about a shaft at the upper end thereof for transporting articles from the upper end of said system to a receptacle located beyond the lower end of said system and adapted for vertical movement as said articles are deposited therein, a chute aligned with said transport system and connected at the lower end of said system for transporting the articles from said transporting system into said receptacle, said transporting system comprising at least one conveyor belt, and said chute comprising a channel for each conveyor belt; of said transport system, each said channel being provided with a plurality of flaps fitted within said chute so that the distance between two successive flaps within the same channel is substantially half the length of the articles being transported.

2. The packing machine according to claim 1 further comprising counterweights provided on said flaps so that said flaps swing in a downward direction as a result of the weight of the articles being supplied for packing and are returned to their original position after an article has passed said flap during transport.

3. The packing machine according to claim 1 further comprising a plurality of carriers provided on said conveyor belt, said carriers being placed in pairs at predetermined distances, and a synchronization mechanism arranged for cooperative engagement with said conveyor belt so as to cause a synchronized movement of said belt.

4. The packing machine according to claim 1 further comprising a drive means located at the lower part of said transport system for swinging said system with said chute about said shaft between two extreme positions.

* * * * *